United States Patent

[11] 3,585,377

[72] Inventor Donald C. Jessep, Jr.
Pound Ridge, N.Y.
[21] Appl. No. 833,411
[22] Filed June 16, 1969
[45] Patented June 15, 1971
[73] Assignee International Business Machines Corporation
Armonk, N.Y.

[54] FAIL-SAFE DECODER CIRCUITS
7 Claims, 7 Drawing Figs.

[52] U.S. Cl. 235/153, 307/204, 307/215, 328/92
[51] Int. Cl. H03k 13/34, H03k 19/34
[50] Field of Search 340/146.1; 307/204, 215; 328/92; 235/153

[56] References Cited

UNITED STATES PATENTS

| | | | |
|---|---|---|---|
| 3,075,093 | 1/1963 | Boyle | 307/215 |
| 3,283,169 | 11/1966 | Libaw | 307/204 |
| 3,421,018 | 1/1969 | Martin | 328/92 X |
| 3,422,284 | 1/1969 | Martin | 328/92 X |
| 3,446,990 | 5/1969 | Goldberg | 328/92 X |

OTHER REFERENCES

Watanabe and Urano, " Fail-Safe Logical System," Electronics and Comm. in Japan, Volume 50, No. 2, Feb. 1967, pp. 134— 137, Copy in Nat. Bureau of Standards Library, TK 7800 D 413, Room E01 Admin. Bldg.

*Primary Examiner*—Eugene G. Botz
*Assistant Examiner*—Charles E. Atkinson
*Attorneys*—Hanifin and Jancin and Roy R. Schlemmer, Jr.

ABSTRACT: A fail-safe decoder utilizing individual fail-safe logic components. The decoder is designed of layers of alternate failure mode logic circuits so that a failure of any of the individual logic elements will always produce an error signal if said failure would cause an output error.

FIG. 1A
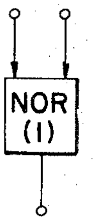
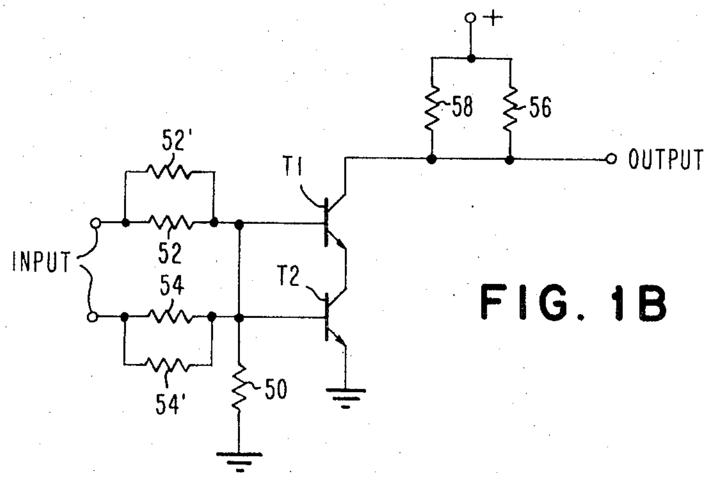
FIG. 1B
FIG. 2A
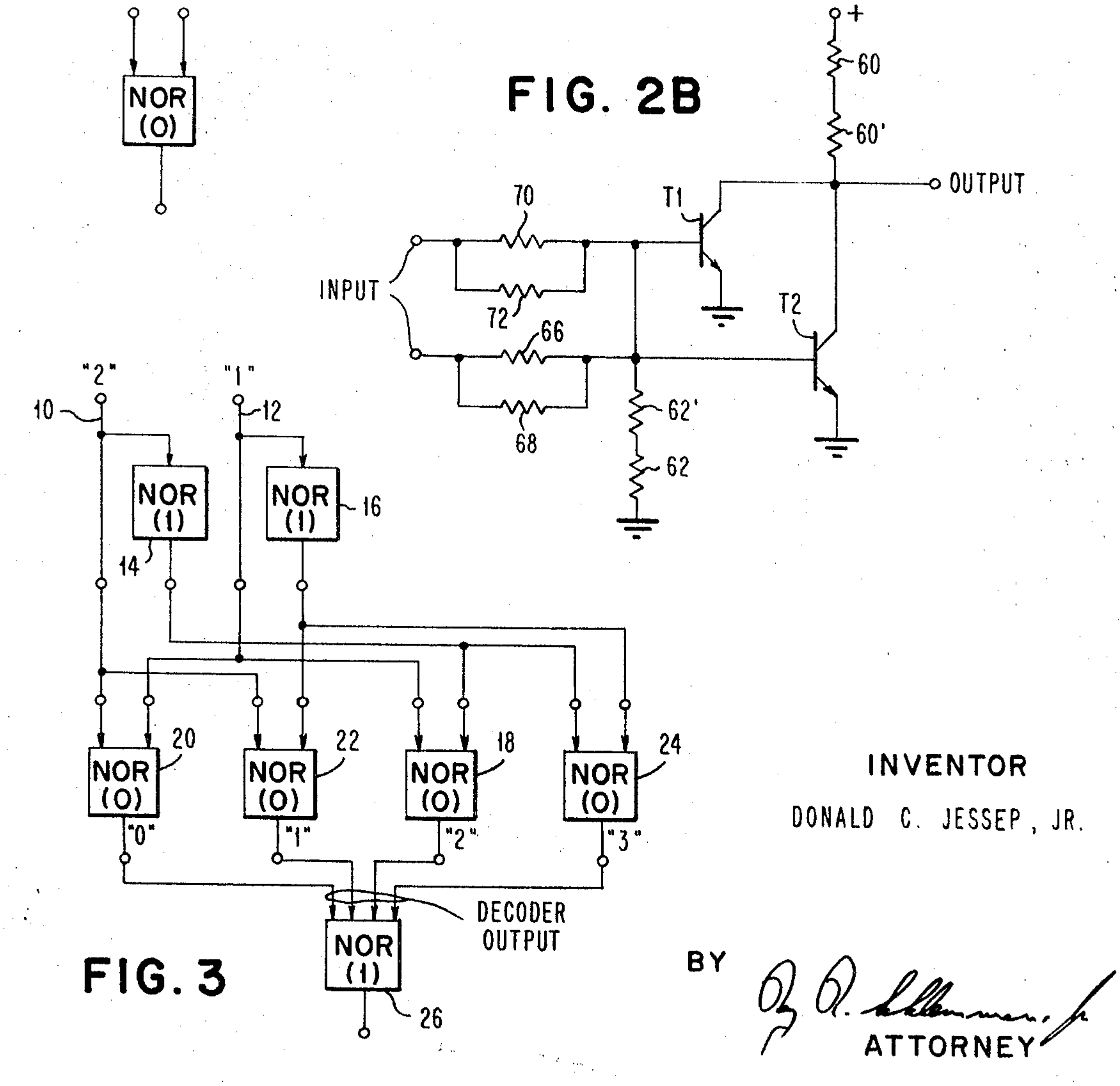
FIG. 2A, FIG. 2B, FIG. 3
INVENTOR
DONALD C. JESSEP, JR.
BY [signature]
ATTORNEY

FAIL-SAFE DECODER CIRCUITS

BACKGROUND OF THE INVENTION

As present day electronic computers become more complex and sophisticated, the total numbers of circuits have greatly increased with an attendant reduction in time necessary to perform given computations. With this great increase in the total as parity bits and these of circuitry in present day complex computing systems, there is an accompanying increase in the number and types of errors or faults which may occur. Moreover, if any given faulty component is producing incorrect data, a great many errors, including incorrect computations and the like, can be produced within a very short span of time before the fault is detected and/or corrected. Many prior art schemes have been proposed for detecting errors in the various segments of a computing system. Probably the most common error detection scheme comprises the use of parity checking wherein the numbers of ones or zeros are counted initially in a given operation on, or the transmission of, a segment of data and this count is periodically checked at various stages within the system as the occasion arises. Some parity checking schemes utilize an extra bit or bits accompanying the transmitted data known as parity bits and bits will be set to a one or a zero usually depending upon the total number of ones in the remaining portion of a data word. Then, at subsequent points in the system, the parity (i.e., odd or even) can be checked utilizing this parity bit as will be readily understood by those skilled in the art. However, for such parity checking systems, means must be provided for detecting and generating the parity bits at various points within the computer system and additional means must be provided for checking the parity at subsequent locations. In addition, parity bit positions must be provided in the data channels which bits take up undesirable space. Also, in prior machines, most parity checking systems have not themselves been checkable during normal data processing operations. In other words, if the checker fails so as to indicate "an error free" condition, subsequent errors obviously will not be detected by this checker until some other means picks up the checker errors per se.

Another considerable problem in detecting and correcting errors in computer systems is that certain portions of the computer do not readily lend themselves to parity checking, etc. For example, in computer memories there are a number of operations which are difficult to check by conventional parity checking. While the parity bit may be stored with the words in memory, a number of the peripheral memory circuits may not be so organized. For example, it is not easy to determine whether the word addressed has actually been read out which can be due to a number of different types of failures. The decoders utilized in the addressing circuitry of a computer and at various other switching points within a computer system are classically difficult devices to monitor for errors. Such decoders normally have a plurality of input lines containing a binary coded address or other switching information and the decoder normally selects a single output line based on the particular address it receives. The types of faults normally occurring in such decoders are either that no line will come up or two lines will come up. This is based on the assumption of a single unit error. It should be noted that multiple errors occur relatively infrequently and usually result in complete unit malfunctions. Accordingly this discussion is primarily directed to the detection of single system errors in both decoder and checker.

With the increasingly greater load which must be born by customer engineers who have the responsibility for maintaining and repairing computers, all reliable diagnostic circuits built in a computer systems are a valuable aid both in terms of indicating that an error is present in the system and, wherever possible, indicating the precise location of the faulty hardware. In the past the provision of large quantities of error detection circuitry has been considered prohibitive in the terms of hardware cost. However, with the vastly more complex present day computers and the extreme difficulty of obtaining and training qualified service personnel, the cost disadvantages of building reliable diagnostic circuits in computer circuitry is becoming more feasible and attractive.

Further, the advantage of integrated circuit technologies and even more advanced microminiaturization technologies is rapidly reducing the cost of individual circuit blocks whereby heretofore financially unfeasible hardware installed for the purpose of error detection and correction is beginning to be more attractive. It will be apparent from the foregoing description of the existing situation in the computer industry that the problem of error detection and correction is ever present and is continually assuming even greater proportions. In particular, the problems of detecting errors in decoder circuitry has always been difficult and the techniques either unreliable or very expensive. It is the field of improved decoder error detection having built in error detection circuitry which is itself fail-safe to which the present invention is directed.

SUMMARY OF THE INVENTION AND OBJECTS

It has now been found that a family of fail-safe decoder circuits may be built utilizing individual logic blocks which always fail to a predetermined state. The decoder is constructed such that any single failure in the decoding logic will cause either no error or a failure to select an output line. Finally, the error detecting monitor for the output of the decoder per se is designed to provide an error indication when either there is no output or when the monitor itself becomes faulty. It may thus be seen that the resultant circuit will provide a failure indication due to any failure in either its decoding elements or in its output error monitor.

It is thus a primary object of the present invention to provide a family of fail-safe decoder circuits.

It is a further object to provide such a decoder made of individual fail-safe logic blocks which fail to a predicted state.

It is a still further object to provide such a decoder circuit utilizing a family of fail-safe NOR blocks which may be designed to fail to a "1" or a "0."

It is yet another object to provide such a decoder wherein all of the logic blocks perform the identical logic function but which fail to selected states.

It is yet another object of the invention to provide such a decoder having $N$ binary input bits for selecting one of $2^N$ output lines and wherein any decoder circuit failure per se affecting the output causes no output line to be selected.

The foregoing and other objects, features and advantages of the invention will be apparent from the following more particular description of preferred embodiments of the invention, as illustrated in the accompanying drawings.

DESCRIPTION OF THE DRAWINGS

FIG. 1A is illustrative of the symbol utilized herein for a NOR block which fails to a "1" state.

FIG. 1B is a schematic diagram of a circuit which would perform the logical function of the logic element shown in FIG. 1A.

FIG. 2A is illustrative of the symbol utilized herein for a NOR block which fails to a "0" state.

FIG. 2B is a schematic diagram of a circuit which would perform the logical function of the logic element shown in FIG. 2A.

FIG. 3 comprises a logical schematic diagram of a fail-safe decoder circuit according to the present invention for a two bit input code.

DESCRIPTION OF THE DISCLOSED EMBODIMENTS

Figures 4, 5:
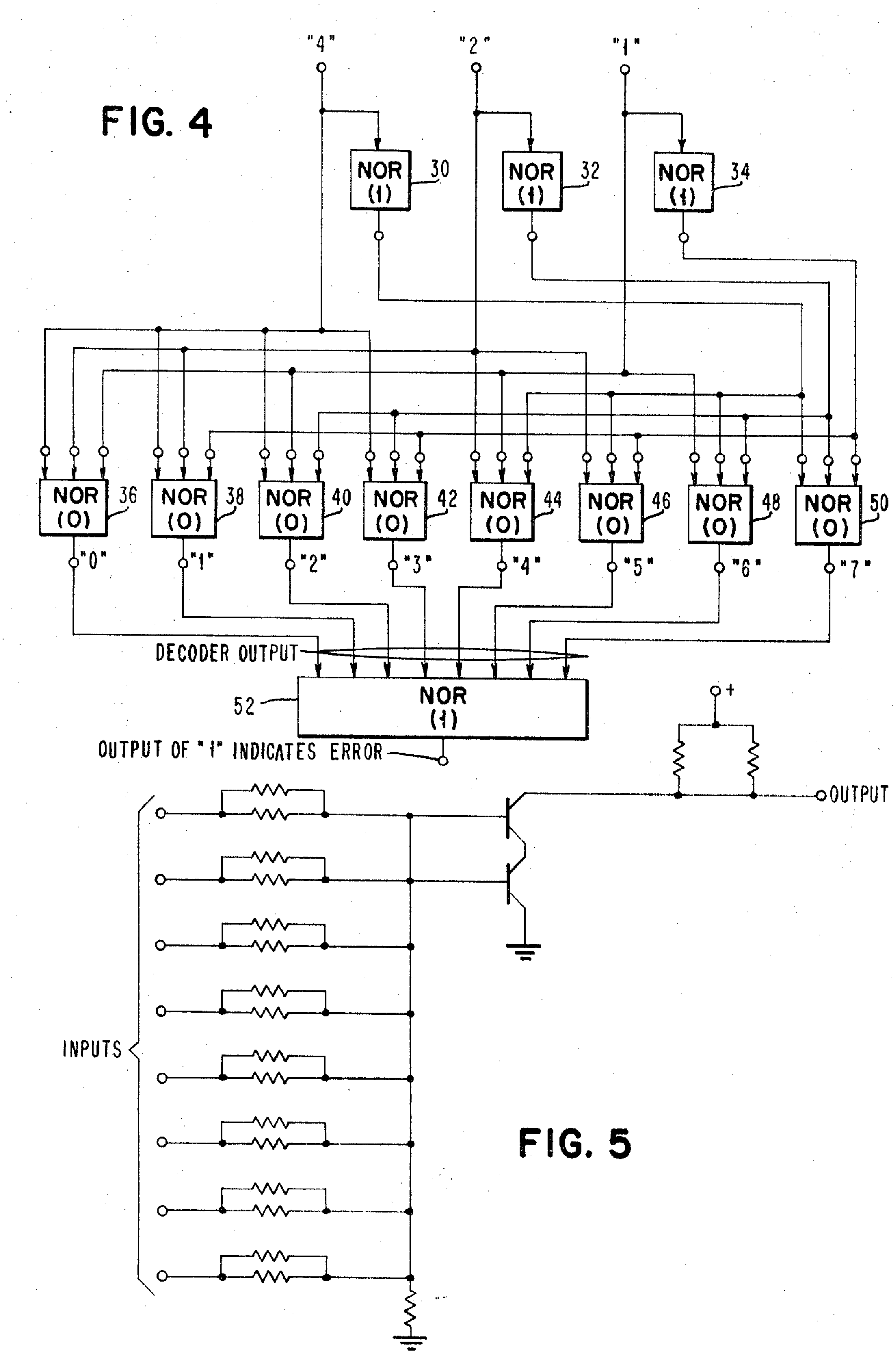
FIG. 4 comprises a logical schematic diagram for a fail-safe decoder constructed in accordance with the principles of the present invention for a three bit input code.
FIG. 5 comprises a schematic diagram of a NOR block suitable for use as a fail to "1" output monitor for the final stage of the decoder circuit FIG. 4.

The objects of the present invention are accomplished in general by a fail-safe decoder design constructed of individual logic elements which fail to a predicted state, said decoder comprises an input section, a logical decoding section having plural output lines such that only one line will be selected at any given time assuming correct operation and an error monitor connected to concurrently check all said output lines. The monitor is a logic block which fails to a predicted failure state, said state also being an error indication for the overall decoder. According to a preferred embodiment of the invention, said monitor is a logical NOR circuit and all of the logical blocks, both in the input to the decoder and in the decoder logic circuitry itself, are similarly NOR logic blocks. A further characteristic of these NOR blocks is that the individual blocks making up the logical circuitry of the decoder per se are selected to fail to a state which will result in a failure to select an output line. An additional set of NOR logic blocks in the decoder input which are utilized to in effect convert a given input to the input and its inversion are similarly selected to have a failure state which will cause a failure to select any output line in the event that a failure of such block would cause an output error.

The invention will now be described with reference to the drawings in which preferred embodiments of the invention are set forth.

Referring first generally to FIGS. 1A, 1B, 2A and 2B, there are shown the contents of two predicted failure state NOR logic blocks. FIG. 1A shows the logical representation utilized in FIGS. 3 and 4 for NOR block designed to fail to a (1) state. What this means is that any error producing failure of the logic block per se will cause a "1" output to be produced at its output line. FIG. 1B is a schematic diagram of such a NOR block. Its operation will be described subsequently.

FIG. 2A is similar to FIG. 1 in that it 77 the representation of a NOR block designed to fail to a predetermined (0) state. As in the above case, in the event of any circuit failure within this block, which would cause an output error, the output will go to a "0" state. FIG. 2B is a schematic diagram of such a fail to "0" NOR logic block. Its operation will likewise be described subsequently.

FIG. 3 is a logical schematic diagram of a fail-safe decoder circuit constructed in accordance with the teachings of the present invention and designed to be connected to any two bit input line of the single rail-type. Thus, either of the two input lines, 10 or 12, may carry a "1" or a "0" at any time. In order to convert this single rail input to an equivalent two rail input, the NOR blocks 14 and 16 are utilized. Thus, any time the line 12 has a binary "1," the output OF THE NOR 16 will be a "0" due to the function of the nor logic. As is well known, any NOR circuit having one or more binary "1" inputs will produce a binary "0" output and vice versa regardless of the number of inputs to the circuit. This of course holds true for all of the NOR blocks utilized in both the embodiments of FIG. 3 and FIG. 4. It will also be noted in both FIGS. 3 and 4 that the binary weighting of the input lines indicated by the numbers in quotes adjacent thereto and the decimal equivalent of the decoded output lines is similarly indicated below each output NOR block by numbers in quotes. The actual operation of the decoder is thought to be quite obvious from the circuit connections and the binary input weightings and will not be explained in further detail as this is generally considered to be well known in the art. However by way of example, the decoding of a decimal "2" from the binary input 10 will be briefly explained. For a binary 2 input the line 12 will carry a binary 0 and the line 10 will carry a binary 1. The binary "0" on line 12 is reflected as a first "0" input to the NOR block 18 and the binary "1" appearing on line 10 is inverted to a "0" by the nor block 14 which provides the second "0" input to the NOR block 18 thus causing its output line to be active or produce a binary "1." This raising of the output line signifies the decoding of the number 2 by the decoder.

Now consider the different possible failure modes which can occur in the decoder in FIG. 3. First, let it be assumed that one of the input signal inverters 14 or 16 fails, say NOR block 16. As stated previously, this circuit is so designed that it will fail to a binary "1" state. As long as line 12 is at logic "O," the decoder still functions correctly since even though block 16 is stuck at a "1," a correct output will be produced and no error will be detected since the condition is not affecting the output (is not an error). However, as soon as a binary "1" appears on line 12, there is a logical "1" applied to all of the subsequent decoder blocks 18, 20, 22 and 24. Thus, since the logic function of these decoder NOR blocks is such that any binary "1" input will cause a "0" output, the result will be that none of the output lines from the decoder blocks will be activated, thus producing an error condition. This error condition is detected by the NOR block 26 since an all zero condition in this block input causes a binary "1" output which state may be utilized to trigger any convenient type of alarm. Thus, it may be seen that any error in one of the input inverter NOR blocks 14 or 16, which will result in incorrect decoder operation, causes the monitor stage 26 to produce a failure output. It should perhaps be noted in passing that if the input blocks where chosen to fail to a "1," incorrect operation could occur since two output lines would then be chosen which would be a condition not detectable by the monitor 26.

Now assume that one of the actual decoder logic blocks 18, 20, 22 or 24 fail. Assume, for example, that blocks 18 fails, this time to a "0" since this is the way that this block is designed. As long as one of the blocks 20, 22 or 24 is active, i.e., producing an output, the failure to "0" of the block 18 does not cause an error signal since technically the decoder is still functioning properly. However, when blocks 20, 22 and 24 are all in the inactive state, due to the fact that the input has selected or is attempting to select block 18, all of the outputs will again be "0" or inactive and the monitor block 26 will produce an output alarm.

Finally, suppose the block 26 fails. As will be apparent, it will fail to the "1" or alarm state. Thus, the system will be alerted to the fact that there is an error of some sort in the decoder either in the input, the decoder logic or in the actual alarm monitor. Thus, it may be seen that the decoder produces an alarm for a failure in any one of its logic components which would render an incorrect output.

Referring now to fig. 4, there is shown a somewhat expanded form of the decoder shown in FIG. 3, this time for three binary inputs instead of two with the obvious selection possibilities of up to eight output lines since in this situation $N=3$ and $2^N=8$. The circuit of FIG. 4 is arranged in exactly the same way as the circuit of FIG. 3. It being noted that the three input inverters comprising NOR blocks 30, 32 and 34 are designed to fail to a "1" as indicated by the (1) within the block. Similarly, the blocks 36—50 are designed to fail to a "0" and finally the block 52 comprising the output monitor is designed to fail to a "1." The primary circuit differences from the embodiment of FIG. 3 are that the decoder blocks 36—50 have three inputs instead of four as in FIG. 3. Otherwise, the operation is exactly the same. Any failure in one of the input blocks 30, 32 or 34 will cause "1's" to be supplied to all of the decoder blocks in the event of an incorrect condition arising, i.e., the associated input line also being set to a "1." Thus, with all "1's" being supplied to the decoder blocks, all of the output lines will remain at "0." The same situation applied to the decoder blocks 36—50. As long as the failure state, i.e., "0" does not produce an output error, no error alarm will be triggered by the block 52. However, as soon as the failed block is selected by the input code but fails to activate its output the other blocks will of course all be at "0" thus causing an error signal from block 52. Finally, a failure in the block 52 to a "1" will of course signal an output error. As in FIG. 3, the input lines are indicated by the numbers in quotes indicating their binary weighting relative to the output lines from the decoder which are similarly labeled according to their decimal equivalent.

Having thus described the operation of the two disclosed embodiments shown in FIGS. 3 and 4, it will be readily appreciated that this decoder design may readily be extended to any desired number of inputs with the obvious provision of NOR blocks having more input lines. The design of such blocks is known in the art and will be apparent from a subsequent description of the operation of FIGS. 1B, 2B and 5.

The following description describes specific failure modes for the circuits actually shown. For a more generalized description of such circuits, reference is made to an article by Mine and Koga entitled "Basic Properties and a Construction Method for Fail-Safe Logical Systems" on page 282 of *IEEE Transactions on Electronic Computers*, Vol. EC–16, No. 3, June 1967.

FIG. 1B is a schematic diagram of a transistorized NOR block designed to fail to a "1" positive voltage bias. In both the circuits of FIG. 1B and FIG. 2B a positive bias source is shown and as will be understood the positive voltage appearing at the output will represent a binary "1" and essentially ground potential would represent a binary "0." As will be understood, for both of these circuits, the present design is intended to take care of the case of a single component failure.

Referring now specifically to FIG. 1B, which is a schematic of such a NOR block designed to fail to a "1," what is desired is that if any of the components fail, positive voltage will appear at the output. The only two possible failure modes for the resistors is an open or a short. As for the two transistors, it may also be assumed that a transistor may either open or short. In the case of an open in one of the transistors, this will automatically use the output to be stuck at a "1" since the two transistors are in series and if one is open in no circumstances can the output then be grounded. If one of the transistors should short, the fact that the other transistor is in series therewith will prevent the output from being inadvertently grounded with the result of a logical "0" output. Under normal operating conditions, with a logical "0" at both inputs, the transistors t1 and T2 are cut off, thus, placing the positive battery bias or "1" signal on the output line. As soon as a "1" is applied to either input the transistors become conductive producing a binary "0" output. Assume now that one of the resistors 52 or 54 fails to an open state. If a binary "1" is applied to either input, it obviously will not reach the base electrodes of the transistors. Therefore, the transistors will remain out off and a logical "1" will still appear at the output. If this occurs, the circuit is effectively converted to a single input NOR or an inverter. While the circuit will either operate properly or fail to a "1" with resistors 52 or 54 opening, by providing the resistors 52' and 54', this situation may be avoided. If the base-to-ground resistor 50 should open, the same result occurs since it is normally not possible to drive the transistors T1 and T2 into conduction, and again the output will stay at the positive potential or binary "1." In some cases even with the resistor 50 open the "1" appearing at the inputs would drive the transistors into conduction. However, this would still be given proper operation. If the resistor 50 should short, the transistor bases would firmly by clamped at ground, thus keeping them open with a resultant fail to "1" output. Finally, if either of the two parallel resistors 56 or 58 should open, a path will remain through the other resistor so that proper operation of the circuit will still be possible. Thus it may be seen that for any of the circuit failures mentioned, the output will go to the binary "1" failure state or the operation will be unaffected.

FIG. 2B, as stated previously, represents a version of such a basic NOR block designed to fail to a binary "0" state. Consider first the faulty operation of the transistors. If either of these transistors shorts, the positive voltage will be shunted to ground and thus there will be in effect a binary "0" output. Conversely, if one of the transistors opens, it is still possible for the other transistor to be rendered conductive by a "1" appearing on either of the inputs. If the resistor 60 should open, obviously it will not be possible for the positive or binary "1" output to be produced and thus the circuit will be stuck at a binary "0." However, if the resistor 60 should short, the positive bias would be directly connected to the output regardless of the input accordingly resistor 60 is placed in series to prevent said circuit from failing to a "0." If either the resistor 62 or 62' should open, the circuit parameters are such that a "1" appearing at either input will still be effective to bias the transistors T1 and T2 into conduction and produce a "0" output when necessary. However, if one should short without the other resistor present, it would be possible for the circuit to be struck at a "1." Similarly with the pairs of resistors 66 and 68 for the lower input and 70 and 72 for the upper input, if either resistor should open the other resistor will still function to allow the input signal to bias the transistors t1 and t2 into conduction and thus again provide the proper binary "0" output. It will thus be noted that in FIG. 2B a failure in resistor 60 or a shorting of T1 or T2 will render the circuit stuck at a binary "0." However, any of the other single failures mentioned will allow the circuit to continue to operate properly.

The circuits of FIGS. 1B and 2B are exemplary of possible design for all NOR blocks having a preferred or a predicted failure mode to binary "1" and binary "0" respectively. It is of course to be understood that other circuit designs having a weighted or predictable failure mode could be substituted for the specific circuits of FIGS. 2A and 2B.

FIG. 5 is shown by way of example as to how a more than two input NOR circuit could be built. It would still be only necessary to utilize two transistors to take care of the situation where a short might occur which would cause the output to be inadvertently stuck at "0" instead of "1." As with the circuit of FIG. 1B, if any of the input resistors opened, the "1" signal associated therewith would never be applied to the circuit and assuming that the other inputs remain at "O," the transistors would remain in the cutoff state, thus, producing a binary "1" at the output.

There has thus been disclosed and described a family of decoder circuits having improved reliability wherein a logic component failure will either not affect the output or will cause an error indication. That such decoders have wide potential use in future computers is quite obvious. With continuously advancing monolithic and other microminiaturization circuit fabrication techniques such circuits as these will see wider utilization.

While the invention has been particularly shown, and described with reference to preferred embodiments thereof, it will be understood by those skilled in the art that various changes in form and details may be made therein without departing from the spirit and scope of the invention.

What I claim is:

1. A fail-safe decoder circuit constructed of individual logic elements which fail to a predicted state, said decoder comprising an input section having $N$ binary input lines, where $N>1$, and $N$ pairs of output lines, a logical decoding section having $2N$ input lines connected to the $N$ pairs of output lines from said input section and having $2^N$ output lines such that only one output line will be selected at any given time assuming correct operation of the decoder and an error detecting monitor connected to said plural output lines, said monitor being a logic block which fails to a predicted state said predicted state comprising an error indication for said decoder wherein no output line has been selected by said decoder.

2. A fail-safe decoder as set forth in claim 1 wherein said monitor comprises a logical NOR circuit.

3. A fail-safe decoder as set forth in claim 2 wherein said monitor NOR circuit produces a binary "0" output with any binary "1" input and a binary "1" output with all binary "0" inputs, or in the event of an internal failure which would affect the output condition.

4. A fail-safe decoder circuit as set forth in claim 1 wherein each of said N binary input lines of said input section is capable of being in a binary "1" or binary "0" state, said input section further including $N$ single input logical NOR blocks connected to each input line which function as an inverter, the outputs of said $N$ input lines and said $N$ input NOR blocks providing $N$ complementary input signal pairs to the decoder logic section, said decoder logic section including $2^N$ decoder NOR logic blocks, each block providing a possible one of $2^N$ output signals on said $2^N$ decoder output lines wherein one output line emanates from each decoder NOR block, said input NOR logic blocks being designed to fail to a first binary state, said decoder NOR blocks being designed to fail to a second binary state and a monitor NOR block being designed to fail to said first binary logic state.

5. A fail-safe decoder as set forth in claim 4 wherein said decoder logic circuitry is composed entirely of said $2^N$ logic blocks and wherein each NOR block has $N$ individual inputs and wherein there is one and only one input to each block from each input or its associated inverter.

6. A fail-safe decoder circuit constructed exclusively of NOR logic elements wherein there are $N$ binary decoder input lines each capable of being in a binary "1" or binary "0" state, and where $N>1$, a first logic level comprising $N$ single input logical NOR blocks connected to each input line which function as inverters, the outputs of said $N$ input lines and said $N$ first level input NOR blocks providing $N$ complementary input signal pairs to a second level of decoder logic, said second decoder logic level including $2^N$ NOR logic blocks, each block providing a possible one of $2^N$ output signals on $2^N$ decoder output lines wherein one output line emanates from each decoder NOR logic block and wherein one and only one output line will be active at any one time when the decoder is operating properly, each said second level NOR blocks having $N$ individual input lines and wherein there is one and only one input to each second level NOR block from each of said $N$ complementary input signal pairs emanating from the $N$ input lines and $N$ first level input NOR blocks, said input connection for each second level NOR block effecting the binary decoding function, an error detecting monitor connected to said $2^N$ output lines, said monitor being a NOR logic block, said monitor producing a first output state when either the monitor is defective or when the logical decoder circuitry fails to select an output line, said decoder NOR logic blocks being designed to fail to a second logical state wherein it will fail to select an output line if the logical block itself is defective, said input NOR block being designed to fail to said first logical state in the event of a failure within itself.

7. A fail-safe decoder circuit as set forth in claim 6, wherein said monitor NOR block is designed to fail to a binary "1" in the event of no output line selection by the decoder circuit per se or in the event of an internal failure, said decoder NOR logic blocks being designed to fail to a "0" binary state in the event of an internal failure which would erroneously affect the output, and said input NOR blocks being designed to fail to a logical "1" in the event of an internal failure which would erroneously affect the output.